July 8, 1952          H. E. JENSEN          2,602,598

BATTERY PLATE WRAPPING MACHINE

Filed July 23, 1948          2 SHEETS—SHEET 1

INVENTOR.
Henry E. Jensen

July 8, 1952 H. E. JENSEN 2,602,598
BATTERY PLATE WRAPPING MACHINE
Filed July 23, 1948 2 SHEETS—SHEET 2

INVENTOR.
Henry E. Jensen
BY
Barr, Borden & Fox

Patented July 8, 1952

2,602,598

UNITED STATES PATENT OFFICE 2,602,598

BATTERY PLATE WRAPPING MACHINE

Henry E. Jensen, Chillum, Md., assignor to C & D Batteries, Inc., Conshohocken, Pa., a corporation of Pennsylvania Application July 23, 1948, Serial No. 40,306

5 Claims. (Cl. 242—1)

The present invention relates to the manufacture of storage battery plates and more particularly to enveloping the surface of flat pasted battery plates within a suitable fibrous material.

It has heretofore been the practice to cover a pasted battery plate with spun glass or spun plastic, such material being generally in the form of a ribbon or tape which is wound about the plate by hand or mechanically by rotating the plate while feeding the ribbon to the plate. In the former method the cost of applying the tape is prohibitive because it requires trained operators to tediously and slowly wrap the tape about the plate. The mechanical method referred to is also expensive because of the lost time in mounting a single plate, removing it after wrapping, and then replacing by a second plate.

Some of the objects of the present invention are: to provide an improved means for wrapping a tape or ribbon of fibrous material about a flat pasted battery plate; to provide a novel wrapping mechanism for covering a battery plate with a ribbon or tape of fibrous material; to provide a wrapping mechanism for battery plates wherein manual handling of the plates is unnecessary; to provide a wrapping mechanism for battery plates arranged to function in timed relation to a travelling pasted battery plate; to provide a wrapping mechanism for battery plates wherein the wrapping mechanism is located at a predetermined location past which a succession of pasted battery plates are caused to travel at such speed that the fibrous material, in ribbon form, is caused to be wound about each plate in a predetermined overlapping sequence; and to provide other improvements as will hereinafter appear.

Figure 1:
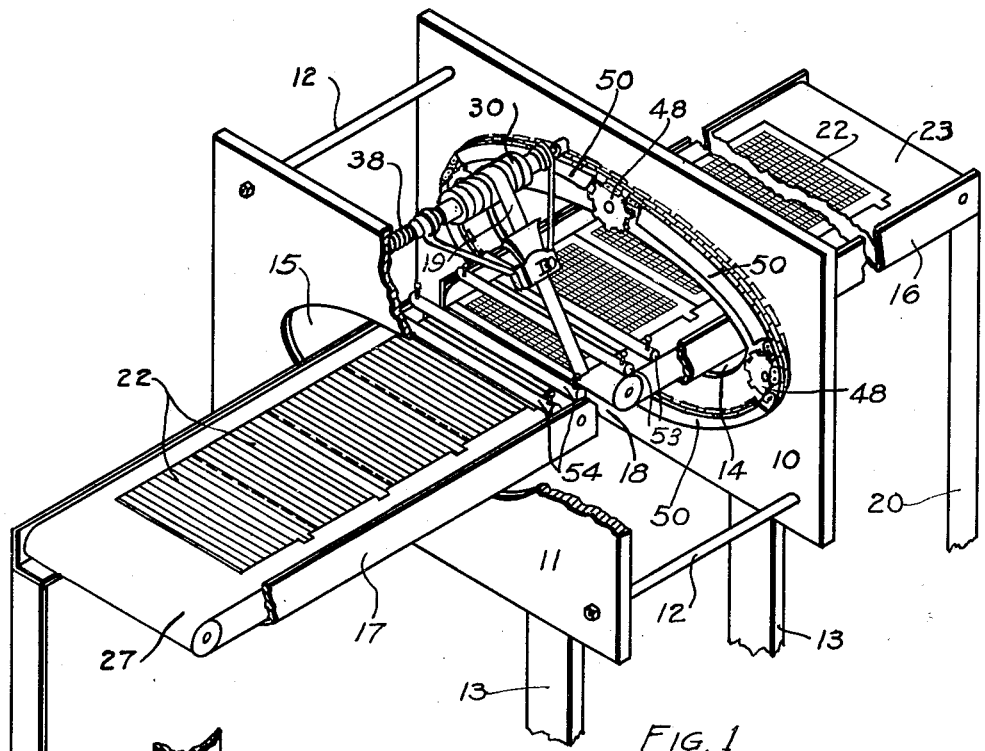
Figure 2:
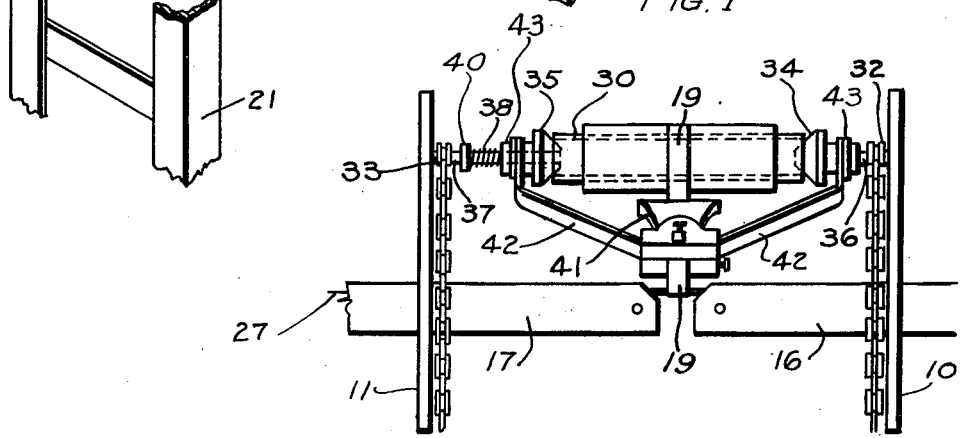
Figure 3:
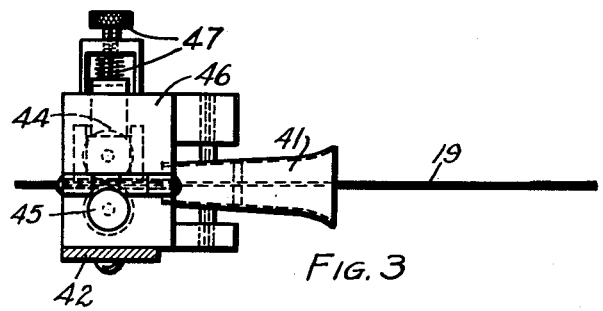
Figure 4:
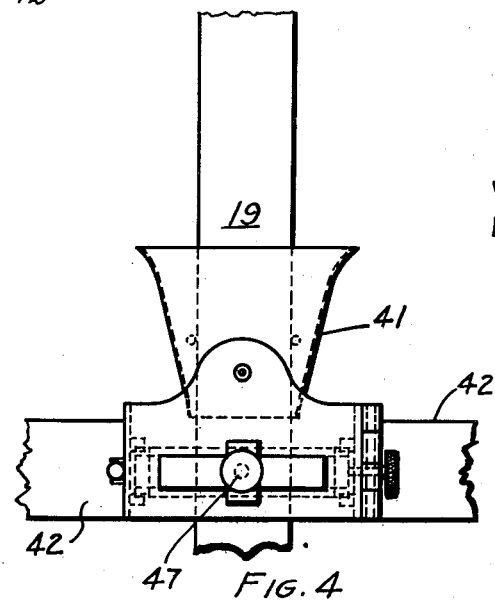
Figure 6:
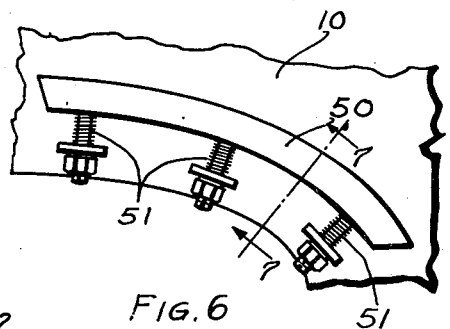
Figure 7:
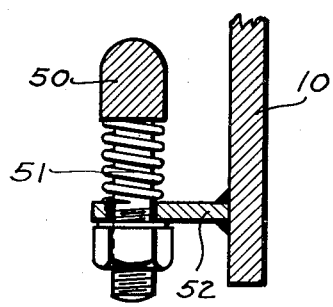
Figure 5:
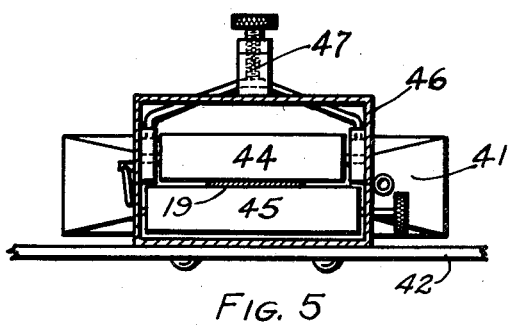

In the accompanying drawings, Fig. 1 represents a perspective of a plate wrapping machine embodying one form of the present invention, the same being broken away for better illustration; Fig. 2 represents a detail in side elevation of the bobbin mounting and driving means; Fig. 3 represents a detail in side elevation of the tape guide on an enlarged scale; Fig. 4 represents a plan of the parts shown in Fig. 3; Fig. 5 represents a detail in front elevation of the discharge end of the tape guide mechanism; Fig. 6 represents a detail of one of the segmental spring biased tracks; and Fig. 7 represents a section on line 7—7 of Fig. 6 and on a larger scale.

Referring to the drawings, one form of fibrous material wrapping mechanism embodying the present invention is shown as carried by two vertically disposed plates 10 and 11 arranged in horizontally spaced apart relation and laterally braced by suitable transverse tie bars 12. The plates 10 and 11 are rigidly supported at a convenient distance from the floor by suitable frame legs 13. The plate 10 is formed with an opening 14 which is axially alined for proper spaced registration with a like opening 15 in the plate 11. As here shown, these openings 14 and 15 are elliptical in shape and of such size as to respectively allow the passage of two battery plate conveyor frames 16 and 17, in the same horizontal plane, and having meeting ends terminating medially between said plates and so spaced apart as to provide a slot 18 through which the sliver or tape 19 being wound can pass freely to form a loop or succession of convolutions encircling a plate as it spans the slot 18, the latter having a width less than the width of such plate. The respective outer ends of the two frames 16 and 17 are supported by suitably braced legs 20 and 21.

For feeding battery plates 22 from a receiving point to pass across the slot 18, the frame 16 mounts an endless input conveyor belt 23 which is arranged to be driven in any well-known manner from a suitable source of power. Likewise, the conveyor frame 17 mounts an endless output conveyor belt 27 for feeding the wrapped plates to a delivery point. Suitable driving means and power supply operate the belt 27. The juxtaposed inner ends of the two conveyor belts 23 and 27 pass around the respective opposed ends of the frames 16 and 17 to form parallel side walls respectively bounding the sides of the slot 18. The spacing of such conveyor ends is such as to restrict the winding tape to travel in a constant vertical plane, that is, the tape is confined against lateral displacement.

As a means for wrapping glass sliver or other tape 19 about the respective battery plates 22, as the plates pass across the slot 18, a bobbin 30, wound with the proper tape material 19, is arranged to be removably attached at its ends respectively to two endless driven sprocket chains 32 and 33 to follow the rotary travel thereof and therefore wrap the tape about a plate 22. As shown, the bobbin 30 is the usual tubular cardboard cylinder arranged for insertion for mounting between two frusto-conical centers 34 and 35, the former being keyed to a stub shaft 36 attached to the sprocket chain 32, and the latter being axially slidable on a stub shaft 37 attached to the sprocket chain 33. A compression spring 38 is coiled about the shaft 37 to bear at one end against the center 35, and at the other end against a collar 40 which is adjustably connected to the shaft 37. By moving this collar 40 axially along the shaft 37, the spring pressure can be adjusted to maintain the two centers in proper supporting position for the bobbin to unwind freely without over-running in the manner of a slip clutch.

For properly guiding the tape as it is unwound, a relatively narrow tapered guide 41 having a funnel-like inlet is mounted on bracket arms 42 supported respectively upon the shafts 32 and 33 in straddling relation with respect to the centers 34 and 35, and being held by end collars 43 secured to the respective centers. The outlet from the guide 41 is arranged to deliver the tape to pass between two rollers 44 and 45 journalled in a frame 46 carried by the arms 42, one of such rollers, namely 44, being spring biased by a spring and thumb screw adjustment 47.

In order to synchronously drive the two sprocket chains 32 and 33, each plate 10 and 11 has sprockets 48 journalled thereon, one of which receives power from a suitable source, while the others serve as idlers. The two chains are supported by suitably contoured segmental guide tracks 50, each being supported by a plurality of self-adjusting spring biased bolts 51, respectively carried by side arm brackets 52 welded or otherwise made fast to the plates 10 and 11.

For the purpose of preventing displacement of the plates during the wrapping operation, two pairs of holding rollers 53 and 54 are provided and arranged in parallel spaced relation transversely above the path of the plates. As shown, the pair of rollers 53 is rotatably carried by the frame 16 at the discharge end of the conveyor belt 23, and the other pair of rollers 54 is rotatably carried by the frame 17 at the receiving end of the conveyor belt 27. The spacing of the pairs of rollers is such that each plate is positively held as it passes across the wrapping slot 18. Thus, as each plate 22 is fed to wrapping position it will first pass under the rollers 53, then travel across the slot 18 to pass under the first of the two rollers 54 while its trailing end is still held by the second of the two rollers 53. Thus, before, during, and after wrapping, each plate is positively held against displacement. It is preferable to spring load these hold-down rollers in order that self-adjustment can take place by reason of plates of varying thickness.

Having thus described my invention, I claim:

1. A machine for wrapping tape about a battery plate, comprising two vertically arranged horizontally spaced plates, each of said plates having an opening, said openings being horizontally alined and dimensioned for the passage of a battery plate, endless chain drives respectively circumscribing said openings, spring pressed tracks respectively supporting said chains, a tape filled bobbin rotatably supported at its ends from said chains, means to rotate said chains and bobbin in synchronism, and means to position a battery plate in the orbit of said bobbin to wrap said plate with said tape.

2. A machine for wrapping tape about a battery plate in accordance with claim 1, wherein said positioning means comprises two alined conveyors spaced apart to form a slot for the passage of the tape as said bobbin is unwound to wrap said tape about a plate across said slot.

3. A machine for wrapping tape about a battery plate in accordance with claim 2, wherein a guide is mounted to rotate with said bobbin for wrapping the tape about a positioned battery plate.

4. A machine for wrapping tape about a battery plate comprising two vertically arranged horizontally spaced plates, each of said plates having an opening, said openings being horizontally alined and dimensioned for the passage of a battery plate, means for positioning a battery plate between said openings, said means forming a slot transverse of a positioned battery plate, a tape filled bobbin, means mounting said bobbin for rotation about its axis, and means to revolve said bobbin and said mounting means in an orbit circumscribing the positioned battery plate.

5. A machine for wrapping tape about a battery plate in accordance with claim 4, wherein self-adjusting hold-down means engages said battery plate while being wrapped.

HENRY E. JENSEN.

REFERENCES CITED

The following references are of record in the file of this patent:

UNITED STATES PATENTS

| Number | Name | Date |
|---|---|---|
| 714,457 | Cunning | Nov. 25, 1902 |
| 791,081 | Davis | May 30, 1905 |
| 2,056,388 | Carlin et al. | Oct. 6, 1936 |
| 2,393,548 | McCoy | Jan. 22, 1946 |
| 2,467,286 | Young et al. | Apr. 12, 1949 |